April 4, 1961   J. E. NEWCOMER   2,977,737
SHOCK ABSORBING MOUNTING FOR A HAY CONDITIONER
Filed Sept. 21, 1959
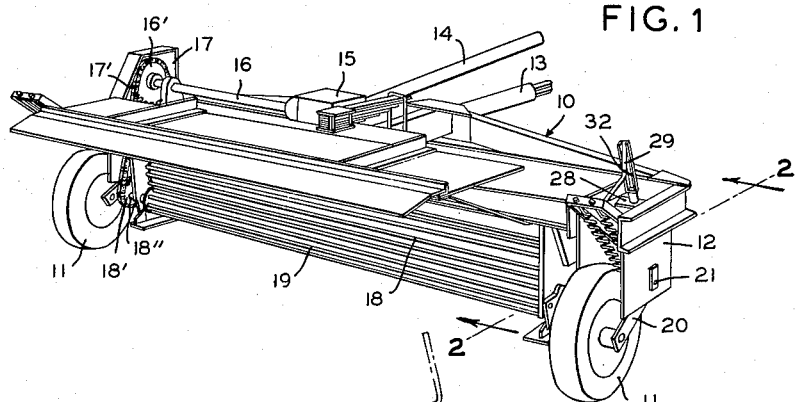
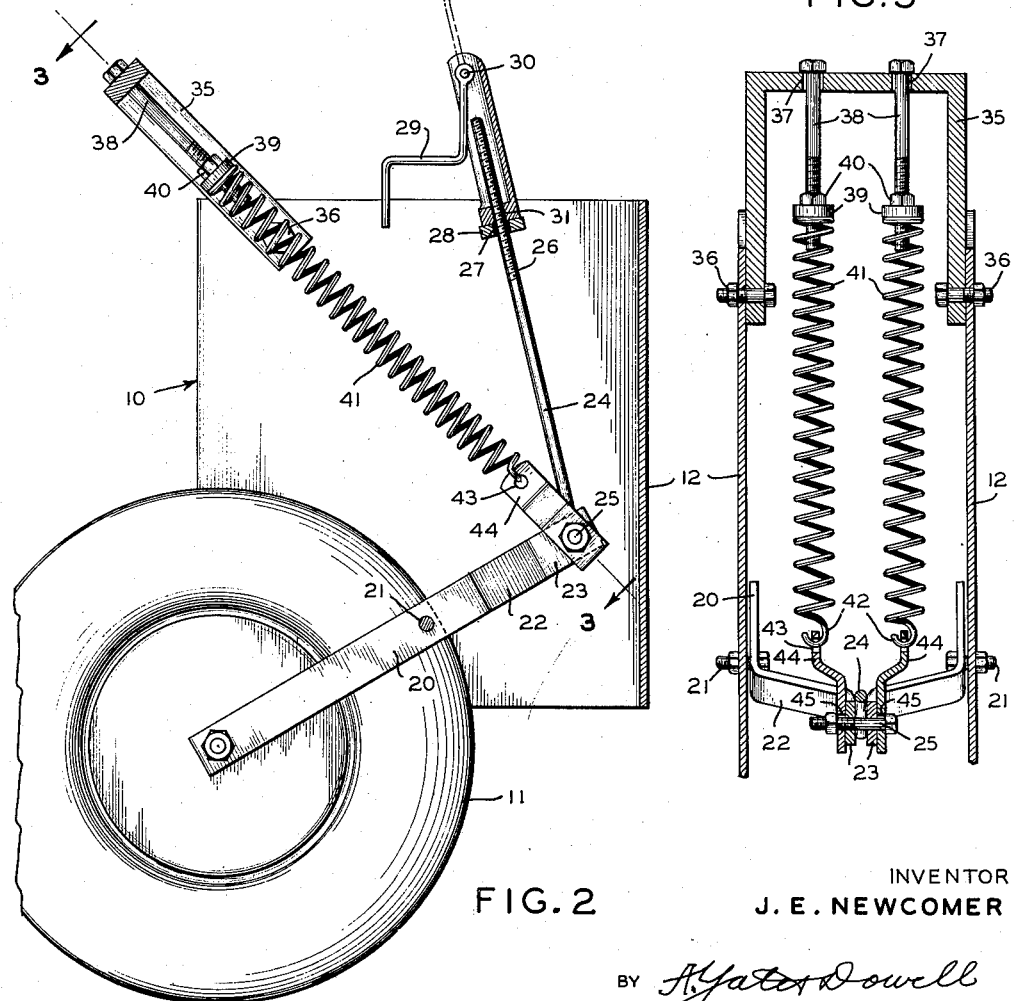
INVENTOR
J. E. NEWCOMER
BY H. Yates Dowell
ATTORNEY United States Patent Office 2,977,737
Patented Apr. 4, 1961

2,977,737
SHOCK ABSORBING MOUNTING FOR A HAY CONDITIONER
James E. Newcomer, R.F.D. 2, Waynesboro, Pa.
Filed Sept. 21, 1959, Ser. No. 841,341
9 Claims. (Cl. 56—1)

This invention relates to farming including the cultivation, harvesting and subsequent treatment or conditioning of hay and other crops and to the implements and equipment employed in the field and elsewhere in the performance of such operations.

The invention relates particularly to a machine for treating hay, in the field or elsewhere after it is cut, to facilitate the drying of the stalks of the same and prior to its being collected and baled and transmitted to a storage barn or the like for subsequent use.

Hay conditioners have been employed with rigidly mounted stalk engaging reels which were easily damaged by contact with rocks and other non-yielding obstructions so that their use has been of short duration and the repairs thereon have been excessive as well as causing delay.

It is an object of the invention to overcome the difficulties enumerated and to provide a resiliently counter-balanced mounting for a hay conditioner of simple and inexpensive construction and which can be readily applied including machines in use and which will enhance the life and usefulness of the machine and reduce the necessity for repairs with consequent time involved.

Other objects and advantages of the invention will be apparent from the following description taken in conjunction with the accompanying drawings, in which:

Fig. 1 is a perspective view of a hay conditioner illustrating one application of the invention;

Fig. 2 is a section on the line 2—2 of Fig. 1; and

Fig. 3 is a section on the line 3—3 of Fig. 2.

Briefly stated the invention provides a resiliently counterbalanced mounting between the wheels and the frame of a hay conditioner which when the reels of the hay conditioner strike an obstruction allows the part struck to move upwardly from the obstruction and the weight thereof to be taken by compression springs one adjacent each end of the machine until the obstruction is passed whereupon the weight of the reels will again be carried on the wheels.

With continued reference to the drawing, a hay conditioner 10 has ground-engaging wheels 11 mounting a frame 12. The hay conditioner is adapted to be pulled through a field of new mown hay by a conventional farm vehicle such as a tractor (not shown).

The frame 12 may have a draw bar 13 for connecting the hay conditioner to the propelling vehicle and a drive shaft 14 connected to the power takeoff of the vehicle for driving a shaft 16 through a gear box 15. The shaft 16 drives a sprocket 16' and a chain 17' within a housing 17 which chain 17' drives a sprocket 18' on a reel shaft 18" to cause rotation of a pair of loosely intermeshing coacting crop treating reels 18 and 19 which receive the hay therebetween and crack or split the stems of the hay to accelerate the drying or curing process while preserving the nutrient value of the crop.

The reels 18 and 19 are rotatably mounted on the frame 12, and the distance of such reels above the ground may be altered by mounting the ground engaging wheels 11 on one end of a wheel fork lever 20.

The wheel fork 20 is pivotally attached to the frame 12 by a pair of bolts or stub shafts 21 located substantially centrally of the wheel forks and the forward ends of such fork have converging portions 22 which terminate in forwardly extending parallel portions 23.

An adjusting rod 24 is disposed between the forwardly extending portions 23 of the wheel fork about a bolt and nut 25 and the opposite end of the adjusting rod 24 has external threads 26 extending through an opening 27 in a plate 28 of the fixed frame 12. An adjusting member is provided in the form of a crank 29 connected by a pivot 30 with an internally threaded or nut portion 31 for cooperative engagement with the threads 26 of the adjusting rod 24. The lower nut portion 31 rests on the upper surface of the plate 28 and when the adjusting crank 29 is rotated the adjusting rod will be raised or lowered depending upon the direction of rotation carrying with it the frame 12 relative to the ground-engaging wheels 11 by pivoting the wheel fork 20 about the pivot 21.

In order to provide the structure with counterbalancing cushioning means and prevent damage to the reels when rocks or stumps are encountered the upper portion of each wheel well is provided with a yoke 35 connected to such wheel well by bolts and nuts 36.

The upper portion of the yoke 35 is provided with a pair of apertures 37 in each of which is received a spring tension adjusting bolt 38 which threadedly engages an attaching disk 39 and is maintained in adjusted position by lock-nuts 40.

A spring 41 is welded or otherwise secured to the bottom of each of the attaching disks 39 and the opposite end of the spring is provided with a hook 42 which extends through an opening 43 in an anchor plate 44.

The lower portions of the anchor plates 44 are provided with openings 45 which receive the bolts 25 and secure the counterbalancing mechanism to the wheel fork.

When the parts are assembled, the bolts 38 are adjusted so that the tension of the springs 41 is such that the springs support most of the weight of the frame. The adjusting member 29 is seated on the plate 28 and bears the remaining weight of the frame. When a rock or other obstacle is contacted by one or both the reels 18 and 19, the frame 12 is caused to move upwardly by the rock or obstacle and the adjusting rod 24 will move upwardly through the opening 27 in the plate 28. The resilient character of the springs will support most of the weight of the frame with only a small part of the weight carried by the obstacle and will therefore prevent damage to the reels. When the obstacle has been passed the weight of the frame 12 will overcome the tension of the springs 41 and will again lower the frame until the adjusting member is in contact with the plate 28.

It will be apparent that a simple, inexpensive, highly efficient counterbalancing mechanism is provided for use in a hay conditioner which will absorb a substantial portion of the impact force on the reels 18 and 19 and prevent damage to such reels when they strike an obstruction in the path in which they travel.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. A wheeled structure having a frame, a pair of ground engaging wheels, forks pivotally mounting said frame on said wheels, means for controlling the height of said frame relative to said wheels including an operating rod connected to one end of each of said forks and an operating crank for raising and lowering each operating rod, counterbalancing means for said structure comprising a yoke mounted on each side of said frame adjacent to said wheels, a pair of bolts mounted in said yoke, an adjustable disk attached to each of said bolts, and spring means connecting said disks and said wheel fork in a manner that said spring means supports most of the weight of the frame.

2. A hay conditioner comprising a mobile frame having coacting crop treating reels thereon, a pair of supporting wheels, a pair of pivoted yokes, each yoke carrying a wheel and each yoke intermediately pivoted on the frame, load carrying means connecting an end portion of each yoke and an adjacent portion of said frame, and resilient counterbalancing means interconnecting said last named end portion of said yoke and an adjacent portion of said frame, whereby when said frame encounters an obstruction said counterbalancing means will assist in carrying said frame thereover.

3. The structure of claim 2 having means for controlling the height of the frame.

4. The structure of claim 2 in which said load carrying means is adapted to engage a fixed stop on said frame.

5. The structure of claim 2 having means for controlling the height of the frame including a first member, and a second member adjustable relative to the first.

6. The structure of claim 2 having means for controlling the height of the frame including a first member, a second member adjustable relative to the first, and a third member for producing such adjustment.

7. The structure of claim 2 having means for controlling the height of the frame including relatively adjustable members, and crank means for producing such adjustment.

8. The structure of claim 2 in which said resilient counterbalancing means includes springs.

9. An agricultural implement comprising a mobile frame having coacting work elements thereon, a pair of supporting wheels, a pair of pivoted yokes, each yoke carrying a wheel and each yoke intermediately pivoted on the frame, load carrying means connecting a portion of each yoke and an adjacent portion of the frame, and resilient counter-balancing means interconnecting said last named portion of said yoke and an adjacent portion of the frame, whereby when said frame encounters an obstruction the counterbalancing means will assist in carrying said frame thereover.

References Cited in the file of this patent
UNITED STATES PATENTS

| | | |
|---|---|---|
| 2,843,990 | Coultas | July 22, 1958 |
| 2,911,780 | Brady | Nov. 10, 1959 |